United States Patent [19]

Schellhaas et al.

[11] Patent Number: 5,411,704
[45] Date of Patent: May 2, 1995

[54] PROCESS AND APPARATUS FOR GENERATING A PESTICIDAL GAS

[75] Inventors: Rainer Schellhaas, Laudenbach; Martin Muenzel, Bensheim, both of Germany

[73] Assignee: Detia Freyberg GmbH, Laudenbach/Bergstrasse, Germany

[21] Appl. No.: 121,479

[22] Filed: Sep. 16, 1993

Related U.S. Application Data

[62] Division of Ser. No. 820,832, Jan. 15, 1992, Pat. No. 5,260,022, which is a division of Ser. No. 275,830, Nov. 25, 1988, Pat. No. 5,098,664.

[30] Foreign Application Priority Data

Nov. 27, 1987 [ZA] South Africa ............ 87/8913

[51] Int. Cl.$^6$ .............. A61L 9/00; C01B 25/10; A01N 59/26; A23K 3/02
[52] U.S. Cl. ............................ 422/29; 422/4; 422/28; 422/305; 423/299; 424/608; 426/320; 426/419
[58] Field of Search ........... 422/4, 28, 29, 305; 423/299; 424/64, 602, 607, 608, 128; 426/419, 320

[56] References Cited

U.S. PATENT DOCUMENTS

| | | |
|---|---|---|
| 3,719,751 | 3/1973 | Rauscher et al. ............ 424/27 |
| 4,421,742 | 12/1983 | Friemel et al. ............ 424/128 |
| 4,600,584 | 7/1986 | Friemel et al. ............ 424/601 |
| 4,725,418 | 2/1988 | Friemel et al. ............ 423/299 |
| 4,814,154 | 3/1989 | Doernemann et al. ........ 423/299 |
| 4,889,908 | 12/1989 | Latif et al. ............ 424/43 |
| 4,966,755 | 10/1990 | Smith ............ 422/28 |

Primary Examiner—Robert J. Warden
Assistant Examiner—Christopher Y. Kim
Attorney, Agent, or Firm—Millen, White, Zelano & Branigan

[57] ABSTRACT

Process and generator for generating a pesticidal gas mixture of phosphine gas and air for fumigating an enclosed environment, e.g. a grain silo with phosphine. Air, moisture content adjusted by drying or humidifying, is passed through a porous bed of aluminum phosphide or magnesium phosphide, preferably in a throw-away cartridge. The resulting mixture of air and phosphine gas is passed into the space. Typical humidities (which determines the phosphine concentration) are 4 g/m$^3$ for "flow through" conditions or 12 g/m$^3$ for "one shot" conditions of fumigation. The cartridge is fitted directly in sealing relationship between inlet and outlet adaptors to serve as the gas generator vessel of the apparatus. The cartridge, completely filled with metal phosphide in powder or granulate form, has cylindrical gas-tight side walls, flexible and stretchable to allow for expansion of the metal phosphide during hydrolysis, and porous end walls.

25 Claims, 2 Drawing Sheets

PROCESS AND APPARATUS FOR GENERATING A PESTICIDAL GAS

This is a division of application Ser. No. 07/820,832, filed Jan. 15, 1992, now U.S. Pat. No. 5,260,022, which is a divisional of Ser. No. 07/275,830, filed Nov. 25, 1988, now U.S. Pat. No. 5,098,664.

BACKGROUND OF THE INVENTION AND PRIOR ART

The present invention relates to a process and apparatus for generating a pesticidal gas mixture of phosphine gas and air for fumigating an enclosed environment with phosphine.

Phosphine gas has been used for decades as a fumigating gas for disinfesting closed environments infested with or suspected to be infested with pests, including higher animals such as rodents, but particularly insect pests such as weevils, bugs, moths and cockroaches, either mature or in various larval stages or in the form of eggs. Such fumigation is particularly used for the disinfestation of agricultural bulk commodities such as grain, legumes, e.g. soya, beans and peas, groundnuts, various other kinds of nuts and seeds, Godder, tobacco, plant and animal fibres and many other commodities. Most commonly such fumigation is carried out by metal phosphide-containing preparations, e.g. tablets or pellets or powders or granulates packed in satchets being added directly to the commodity or into the closed environment. The moisture content of the commodity or air in the environment reacts with the metal phosphide resulting in the generation of hydrogen phosphide in the commodity or environment. This procedure suffers inter alia from the following disadvantages:

a) the phosphine concentration pattern cannot be influenced. As a function of temperature and humidity the phosphine gas concentration initially rises more or less steeply up to a maximum and from there drops asymptotically to zero at a rate which depends on phosphine losses due to leakage, decomposition or other causes. In extreme cases this may result in the phosphine concentration dropping so rapidly that complete killing of the pests, in particular also in their preadult stages, cannot be ensured. As a general rule it is preferred in phosphine fumigation to maintain relatively low pesticidal gas concentrations as constantly as possible over a prolonged fumigation period rather than employing high concentrations for shorter periods, the latter procedure being generally less effective. Accordingly, it would be desirable to be able to regulate the phosphine gas concentration pattern during fumigation and to maintain the desired lethal concentrations or pattern of concentrations over a prolonged period of fumigation by the controlled addition of phosphine gas.

b) The metal phosphide preparations leave behind relatively harmless inert decomposition residues. However, these residues usually also have greater or lesser relatively minor residual contents of undecomposed metal phosphides. These residues remain in the commodity and must be removed eventually by aspiration or by recollecting the spent sachets (or equivalent packaged forms of the pest control agent).

Accordingly, various proposals have been made or become known in the past, whereby it is said to be feasible to generate phosphine gas from metal phosphides externally of the environment to be fumigated and to feed the gas so generated into the enclosed enviroment, respectively into the commodities therein contained:

a) In U.S. Pat. No. 4,200,657 a process is described wherein phosphine gas is generated by the decomposition of metal phosphide pellets or tablets, whilst the air to which the phosphine gas is released .is slowly circulated through grain or like commodities contained in a silo equipped with gas circulation means. The disclosure mentions the possibility of introducing the metal phosphide composition anywhere in the system, including the gas circulation ducts, however, in practice this method is carried out invariably with the metal phosphide compositions widely scattered over or inside the commodity to be fumigated, because of the risk that otherwise high local concentrations of phosphine might be formed which could easily exceed the autoignition concentration. This latter problem is also addressed in an improvement of that process forming the subject of U.S. Pat. No. 4,651,463. There as well, the gas generation generally is carried out in the same space which also contains the commodity to be fumigated.

b) The external generation of phosphine gas by the hydrolysis of metal phosphides, e.g. using liquid water, is also suggested in ZA-PS 80/7479. According to that disclosure specific additives are employed in the metal phosphide compositions designed to reduce the violence of and to slow down the hydrolysis reaction thereby to reduce the risk of autoignition. This particular proposal is applicable only to the hydrolysis of aluminium phosphide and is ineffective, for example with magnesium phosphide. Moreover, the additives there disclosed are sometimes undesirable.

c) ZA-PS 86/4806 discloses the fumigation of grain in silos using bottled mixtures of phosphine and inert gases such as nitrogen or carbon dioxide kept in steel cylinders and passsed from such cylinders by pressure release into the silo cells. That process is expensive because it requires the keeping of stocks of expensive gas steel cylinders equipped with valves made of such materials that they are not attacked by phosphine gas. The bottling itself is expensive, and particularly because the steel cylinders preferably contain at the most 3% by volume of the phosphine gas. Also, the manufacture of and handling of bottled phosphine gas is somewhat hazardous and can be carried out only at centralised factories from where relatively large numbers of gas-filled bottles have to be transported to the fumigation site.

d) Finally, it has been proposed, in German patent application P 36 18 296.4 to generate phosphine, preferably continuously by hydrolysing the metal phosphide with an inert fluid, e.g. carbon dioxide, containing water. As the inert fluid flows through the phosphide, phosphine gas is generated which is then passed into the commodities to be fumigated. This procedure lends itself also to carrying out the phosphine generation at the fumigation site. However, this procedure also suffers from the disadvantage that relatively large quantities of the inert fluid have to be transported in sealed cylinders or in the form of dry ice to the fumigation site.

OBJECTS AND GENERAL DESCRIPTION OF THE INVENTION

Accordingly, there exists a need for an alternative process and apparatus suitable for generating pesticidal gas mixtures of phosphine gas and air for fumigating an enclosed environment with phosphine, suitable to be carried out at the fumigation site and permitting to establish predeterminable phosphine concentrations in the environment to be fumigated over a desired length of time. Preferably it should be possible to maintain a substantially constant phosphine concentration in the environment or where desired or required to maintain a predetermined concentration pattern in the environment over a fumigation period. To satisfy the existing need, it would be desirable for such apparatus to be convenient to the operator and for the process and apparatus to be capable of being operated without the addition of inert gases.

The present invention provides a process as set out in the opening paragraph wherein a flow of moist air is passed through a space separate from the enclosed environment and containing a hydrolysable metal phosphide which is brought into contact with the flow, the flow being preferably passed through a pervious mass, e.g. a bed of the metal phosphide, the moisture content of the flow being maintained within a predetermined range, adapted to generate in mixture with the air a phosphine concentration in the pesticidal range and below the autoignition concentration of the mixture of air and phosphine the prevailing temperature and pressure, the resulting gas mixture being fed into the enclosed environment.

In contrast to the prior art, effective control over the phosphine gas concentration in the generator space is achieved by virtue of the moisture content of the flow being maintained at a given level. For that purpose the moisture content of the air is appropriately monitored by measuring means known per se, e.g. automatically, and regulated, e.g. as will be described further below.

The invention does not necessarily exclude entirely the addition of inert gases such as carbon dioxide, because optionally a certain amount of carbon dioxide may be included at a predetermined stage of a fumigation process or throughout the process within a range wherein carbon dioxide potentiates the toxic effect of phosphine gas. If such carbon dioxide is added into the air stream prior to its entrance into the gas generator, its effect may be to raise the autoignition concentration, and in that event a correspondingly higher moisture content may be maintained in the air. However, as a general rule, the invention contemplates fumigation without special addition of carbon dioxide gas.

The metal phosphide composition employed may contain additives known per se in the context of fumigation compositions, e.g. tablets or pellets commonly used in prior art processes of phosphine fumigation. The metal phosphide may optionally also be employed in prepacked form, e.g. in the form of applicator devices such as prior art sachets or plates. However, usually for cost reasons this is not preferred. The preferred metal phosphides used in the process are aluminium phosphide, magnesium phosphide and mixtures of both, usually employed in the form of the conventional technical grades.

The invention permits autoignition inhibiting substances, in particular those described in ZA-PS 80/7479 to be dispensed with, however, the optional employment of such substances is not outside the scope of the present invention.

More particularly, and in particular in the absence of substances which increase the autoignition level of phosphine gas, the moisture content is maintained to generate a phosphine concentration in the range of 100 to 13 000 ppm, preferably 1000 to 12 000, more preferably 3000 to 10 000 ppm, in particular 4000 to 8 000 ppm, for example 5000 to 6000 ppm in the gas mixture which is to be fed into the environment.

The moisture content may be adjusted to the required level by passing the air through a drying medium or through humidifying means before entering into contact with the metal phosphide. Preferably the moisture content of the air, prior to its entering into contact with the metal phosphide is maintained in the range of 0,8 to 30 $g/m^3$, preferably 1,7 to 28, more preferably 4 to 15 $g/m^3$, e.g. 4 $g/m^3$ under "flow-through" conditions or 12 $g/m^3$ under "one shot" conditions and the temperature is preferably in the range of 5° C. to 50° C.

The relative humidity of the air prior to its entering into contact with the metal phosphide is in the range of 3 to 100%, preferably 15 to 100%, at temperatures ranging from 5° C. to 50° C., preferably 10° to 40° C., the lower humidity limit corresponding to the lower end of the temperature range and vice versa. Generally the moisture content in absolute terms is a more useful parameter, because it is directly proportional to the phosphine concentration aimed at.

Taking for example a preferred upper limit of 10 000 ppm, this corresponds to 26,8 $g/m^3$ water. To that preferred upper limit the following relative moisture contents correspond at various temperatures:

| Temp/°C. | 30 | 36 | 40 | 45 | 50 |
| --- | --- | --- | --- | --- | --- |
| rel. moisture/% | 97 | 70 | 56 | 45 | 33 |

As regards a more preferred upper limit of 15,0 $g/m^3$ water, the following relationship applies:

| Temp/°C. | 20 | 26 | 30 | 30 |
| --- | --- | --- | --- | --- |
| rel. moisture/% | 100 | 70 | 55 | 40 |

Assuming a lower limit of 2 $g/m^3$ the relationship is as follows:

| Temp/°C. | 5 | 15 | 25 | 40 |
| --- | --- | --- | --- | --- |
| rel. moisture/% | 35 | 20 | 10 | 5 |

In the ideal operating range the relationships are as set out in the following:

| Temp/°C. | 10 | 14 | 18 | 25 | 30 |
| --- | --- | --- | --- | --- | --- |
| rel. moisture/% | 50 | 40 | 30 | 20 | 15 |
| "one shot" 12 $g/m^3$ $H_2O$ Temp/°C. | 16 | 20 | 25 | 32 | |
| rel. moisture/% | 100 | 80 | 60 | 40 | |

According to preferred embodiments the air is withdrawn from the enclosed environment, brought into contact with the metal phosphide as defined and returned into the enclosed environment, mixed with phosphine gas. The flow of air containing moisture is controlled to produce in the enclosed environment a predetermined pesticidal concentration of phosphine gas and to there maintain a predetermined phosphine concentration over a period or a predetermined time-dependent concentration pattern of phosphine gas.

The invention also provides in the event of a disruption of the flow or a rise of the phosphine concentration in the space above a predetermined level, that the air in contact with the metal phosphide is displaced by a fluid inert to the metal phosphide. Such insert fluid could be an insert gas, e.g. admitted from a gas bottle, preferably automatically. However, preferably the fluid is a liquid, e.g. a mineral oil of low viscosity, methylene chloride or other, preferably organic liquid which is inert to the metal phosphide or metal phosphide composition contained in the generator.

Also in accordance with the invention there is provided an apparatus for carrying out the process comprising a generator vessel, including a space adapted to hold an air-pervious mass, preferably a bed of a solid metal phosphide or metal phosphide composition, inlet and outlet ducts for air adapted to conduct a flow of the air through the mass and a pump means, preferably on the feed side of the generator vessel for inducing the flow of the air. The preferred apparatus comprises means adapted to maintain in the air before it contacts the metal phosphide, a moisture content within a predetermined range, for example an air drying device and/or a humidifying device, preferably including means for alternatively connecting these devices into the inlet duct leading to the generator vessel or for causing the air flow to bypass the device(s).

In a particularly advantageous embodiment the generator vessel includes a replaceable cartridge adapted for a flow of moist air to pass therethrough through a permeable charge of metal phosphide contained in the cartridge. Preferably the cartridge comprises gas impervious side walls and gas pervious end walls, defining a space filled with a porous, metal phosphide mass hydrolysable by humidity. Preferably the spaces of the cartridge is completely filled with the mass and includes expansion means allowing the volume of the space to increase in response to increases in volume of the mass when it hydrolyses.

For example the generator vessel is formed by the cartridge fitted in a gas-tight manner between an inlet adaptor for moist air and an outlet adaptor for phosphine-charged air.

Also preferably the pump means includes a power pack driven by a battery, and adapted to drive the pump in the event of power failure and to do so automatically in said event. Advantageously the power pack includes mains-operated means for recharging and keeping charged the battery.

The invention also provides a replaceable cartridge for an apparatus as set out above which forms a chamber having gas inlet and outlet passage means for passing moist air through a porous mass of hydrolysable metal phosphide contained in the chamber. Preferred features of the cartridge will be described further below.

A particular embodiment of the apparatus comprises sensor and monitoring means for automatically monitoring the moisture content of the air or the phosphine concentration of the gas mixture in the generator or for monitoring both. The apparatus may further comprise sensor means for monitoring the gas composition, in particular the phosphine concentration in the enclosed environment and preferably including automatic control means adapted to regulate the air flow and generation of phosphine gas so as to automatically produce a predetermined phosphine concentration in the enclosed environment or maintain therein a predetermined time-dependent concentration pattern.

As an optional safety feature, an embodiment of the apparatus comprises a means for automatically admitting a fluid to displace moist air in contact with the metal phosphide in response to an interruption of the flow through the generator or to a rise in the phosphine concentration produced in the generator above a predetermined level, or both.

In the process and apparatus according to the invention, the mixture of air and phosphine generated in the generator is conveniently removed and separated from the solid residue of metal phosphide or metal phosphide composition. Optionally, a separator means may be provided to separate entrained solids, e.g. dust particles derived from the metal phosphide, before the mixture enters the fumigation space, e.g. a silo.

We have found that by suitable selection in accordance with the present teachings of process parameters and design of the generator, the formation of an ignitable mixture of phosphine gas can be prevented.

In the following the invention will be further described with reference to working examples illustrated in the accompanying drawings. From that description further details of embodiments of the invention may be derived.

BRIEF DESCRIPTION OF THE DRAWINGS

There is shown in

DETAILED DESCRIPTION OF SPECIFIC EMBODIMENTS

Figure 1:
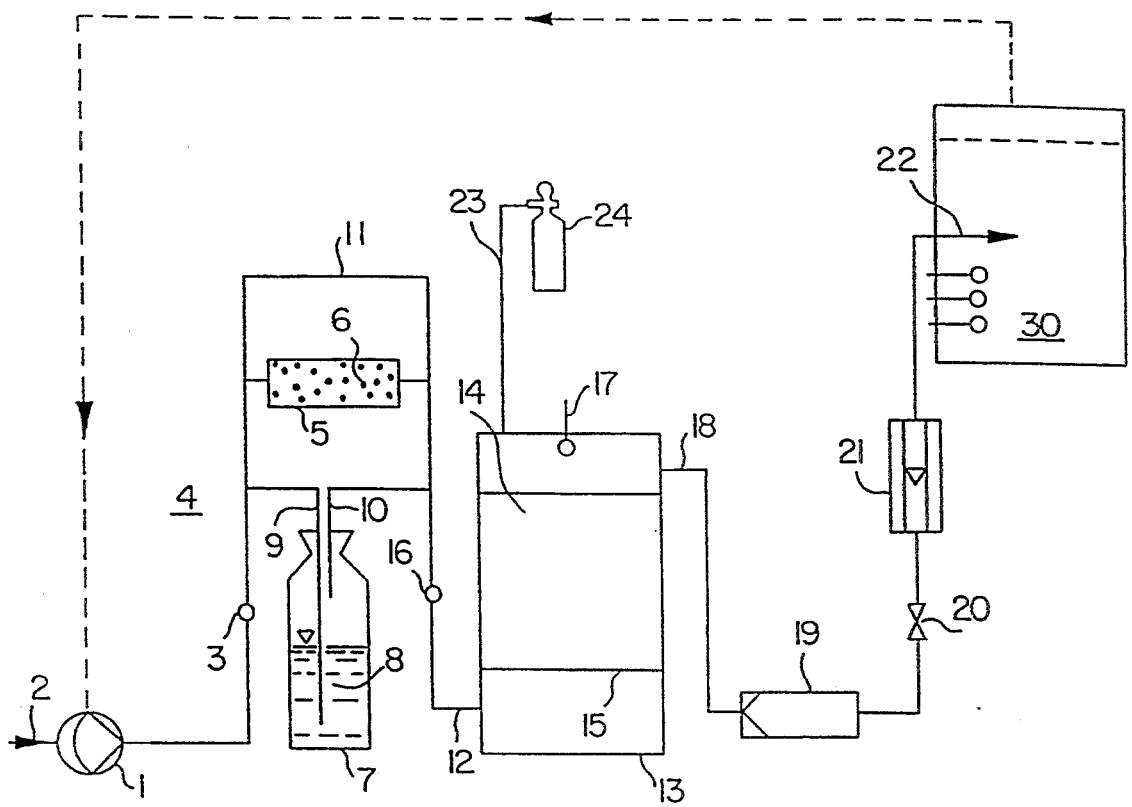
FIG. 1, a diagrammatic view in the form of a block diagram illustrating the process and apparatus according to the invention, FIG. 2, A and B two modifications of means for displacing moist air from contact with the metal phosphide in the generator.

Referring to the drawings, a gas pump 1, e.g. a diaphragm pump serves to draw air either from the atmosphere or from the environment to be fumigated, e.g. a silo, arrow 2. The slightly compressed air proceeds past a moisture sensor 3 to moisture regulating means generally denoted as 4 comprising a drier device 5 filled with a desiccant 6, e.g. silica gel, a moisturiser device 7, diagrammatically indicated by a wash bottle containing water 8 and having inlet and outlet pipes 9 and 10 respectively and a bypass duct 11. The sensor 3 activates electronically controlled valve means (not shown) which determine whether the air proceeds through the bypass line 11 or through the moisturiser 7 or the desiccating means 5 before entering through the feed duct 12 into the bottom end of the generator vessel 13. The generator contains a bed 14 of metal phosphide pellets supported on a gas-pervious support 15. The air having a moisture content maintained at a regulated level, monitored by a sensor 16, similarly acting upon the electronic control means which control the valves of the moisture regulating means 4. As the moist air travels through the bed 14, it causes hydrolysis of the metal phosphide, e.g. aluminium phosphide or metal phosphide, usually aluminium phosphide according to the following reaction:

AlP + 3 H₂O → Al (OH)₃ + PH₃.

A phosphine gas sensor 17 serves to monitor the phosphine concentration in the mixture of air and phosphine emerging from the bed 14 and being withdrawn through the outlet duct 18 leading to a dust separator 19 which separates dust particles e.g. derived from the metal phosphide and its decomposition products from the gas mixture. The gas mixture then proceeds via a throttle valve 20 which is preferably also electronically controlled to adjust the flow rate of the gas mixture to the enclosed environment, e.g. silo, to be fumigated. The same electronic controls which monitor the throttle valve 20 may also serve to control the pump 1. The gas mixture then proceeds through a flow meter 21 which preferably signals the recorded flow rate to the automatic control means for throttle valve 20. At 22 the gas mixture enters the silo or the like (not shown).

The duct 23 serves to connect a fluid admission means to the generator 13. In FIG. 1 this is diagrammatically indicated by an inert gas bottle 24, preferably a carbon dioxide steel bottle, which could optionally be employed to admit a synergistic concentration of carbon dioxide to the gas mixture, but which primarily serves the following function. If for any reason whatsoever, the phosphine concentration monitored at 17 rises above a predetermined permissible limit, the inert fluid is admitted to the generator to displace moist air from contact with the metal phosphide, thereby stopping further hydrolysis and phosphine generation. Such inert fluid also displaces oxygen and thereby raises the autoignition concentration. Excessive phosphine gas concentrations may also arise from a variety of defects (e.g. power failure, pump failure, damage to the ducts), causing the air flow to be interrupted. Residual moisture in the generator will continue to generate phosphine gas which now cannot be swept away by the gas flow. Two preferred embodiments of fluid admission means are illustrated diagrammatically in FIG. 2, wherein the fluid connecting lines of both embodiments leading to the generator 13 are each denoted by 23. Embodiments A and B each comprise a liquid storage vessel 25 containing for example a low viscosity mineral oil having a liquid level 26.

Embodiment A operates as follows: Under normal operating conditions a slight excess pressure, e.g. of about 0,1 bar prevails in the generator vessel 13. The geodetic pressure exerted by the liquid column in the storage vessel 25 is less than the excess pressure in the generator vessel, so that the non-return valve 29 remains closed. Flow interruption through the generator vessel results in a pressure drop causing the non-return valve 29 to open and causing the admission of inert liquid from the vessel 25 into the generator vessel 13 to cause flooding of the metal phosphide bed 14, thereby terminating the hydrolysis.

According to embodiment B, the non-return valve 29 is replaced by a pressure monitor 27 coacting with a magnetic valve 28 which is automatically opened when a pressure drop occurs. In other respects this embodiment operates in the same manner as embodiment A.

Referring again to FIG. 1, the silo 22 is preferably equipped with one or more phosphine sensors 30 for automatically monitoring the phosphine concentration at various localities in the silo. The signals are passed to central electronic control means (not shown) in which preferably the remaining electronic controls of the apparatus are also integrated and which controls the generation of phosphine and its admission to the silo whenever the concentration there drops below a predetermined level. The electronic control means may be programmed to maintain a predetermined, time-dependent concentration pattern in the silo for an optimised pest control effect, depending on e.g. temperature and the nature of the pests which have to be destroyed.

The principles underlying such time-dependent optimised concentration patterns are known to persons skilled in the art and require no description.

Figure 3:
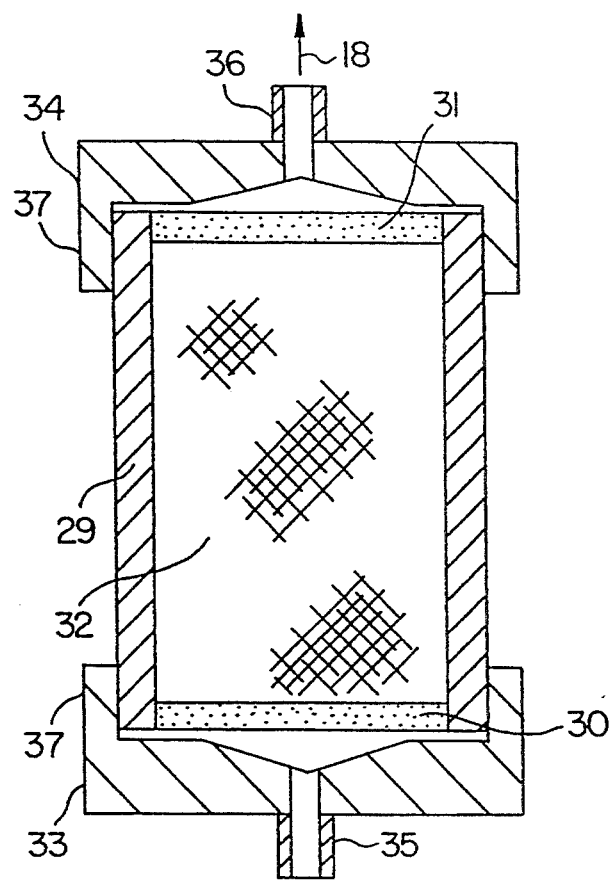
FIG. 3 represents a central section taken along the central axis of a generator for an apparatus according to the invention which includes a replaceable metal phosphide cartridge according to the invention.

The apparatus shown in FIG. 3 represents a generator vessel unit adapted to replace the generator vessel 13 and associated means in FIG. 1. The generator vessel is here formed by a replaceable (throw-a-way type) metal phosphide cartridge comprising flexible and resilient cylindrical side walls 29, e.g. made of a closed pore, gas-impervious plastic foam such as polyethylene foam and porous gas-pervious end walls 30 and 31, constituting gas inlet and outlet means respectively of the cartridge. These porous end walls may be formed of an open pore plastic material or sintered plastic, e.g. sintered polyethylene. The cartride is completely filled with a porous mass of metal phosphide, in the present example a bed of aluminium phosphide or magnesium phosphide powder or granulate. If an aluminium powder is used (typically technical aluminium phosphide having an ALP content of 85%, the balance being mainly inert aluminium oxide) the particle size is preferably mostly in the range 2,5 mm to 0,05 mm. If the metal phosphide is magnesium phosphide powder, its particle size can be adjusted by grinding or granulation in accordance with the reactivity of the magnesium phosphide which in turn (in a manner known to persons skilled in the art) depends on the process by which the magnesium phosphide has been produced. At present aluminium phosphide is preferred. The metal phosphide bed 32 fills the cartridge to such an extent that no empty spaces are present in which major amounts of gas mixture can accumulate which would otherwise present an explosion or fire hazard. For storage and transport the cartridge may be packed, e.g. sealed into any suitable gastight container, preferably a sheet metal cannister or tin. For use the cartridge is removed from such tin and is plugged at its inlet and outlet ends in a gas-tight manner into tight fitting resilient inlet and outlet adaptors 33 and 34 respectively having inlet and outlet nipples 35 and 36 connected to the air inlet pipe 12 and the gas mixture outlet pipe 18 respectively. The adaptors 33 and 34 are cup-shaped having side rims 37, fitting with a tight frictional fit over the cylindrical side walls 29, optionally tightened by means of conventional hose clamps. The inside of the transverse webs of the adaptors each have a shallow taper towards the inlet and outlet nipples 35 and 36.

Alternatively, the ends of the cartridge and the insides of the rims 37 of the adaptors may have matching screw threads allowing the adaptors to be screwed onto the cartridge in a gas-tight manner, optionally assisted by resilient gaskets. The flexibility and resiliency of the cylindrical side walls is designed to allow for the increasing volume of the metal phosphide when it is hydrolysed. Optionally, in addition or alternatively, the side walls 29 may be bellow-shaped, allowing for longitudinal expansion as well. It will be understood that a plurality of the cartridges may be connected in parallel using suitable inlet and outlet manifold means. The monitoring means 17 for monitoring the phosphine concentration of the gas mixture may be installed in the adaptor 34 or in the duct 18.

Figure 4A:
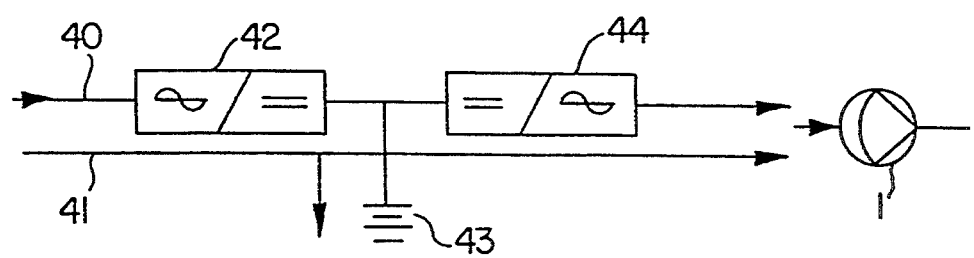
FIG. 4 represents a diagrammatic view of a power supply for the apparatus according to the invention to ensure uninterrupted operation in the event of power failure.
Figure 4B:
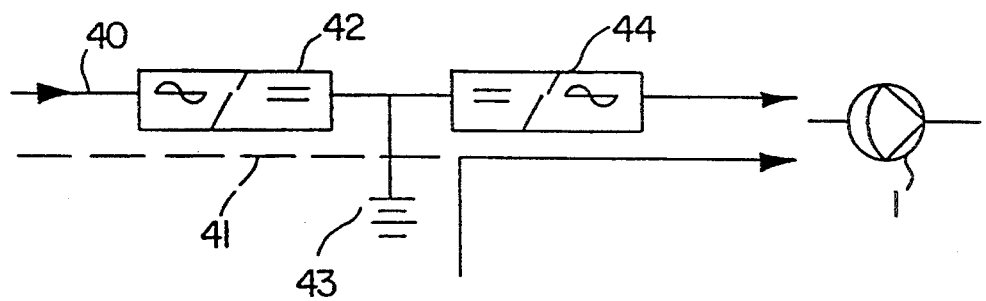

The pump 1 in FIG. 1 is preferably an electric pump. However, because in certain regions power failures are fairly frequent, it is preferred to drive the pump by way of a continuous power unit (CPU), the wiring diagram of which is shown in FIG. 4. (A) represents the operation of the circuitry when the mains power is "on", and (B) when it is "of". Such CPU's are known per se and require no detailed description. The mains power leads are symbolised by a broken line in (B) (symbolising the power interruption). The unit by way of rectifier 42 converts AC into DC and keeps a battery 43 permanently charged. The battery in turn supplies DC to a power converter 44 which converts DC into AC to drive the pump 1. The capacity of the battery is selected so as to be able to keep the system operating for several hours. An alarm device is optionally provided to sound a warning before the battery is exhausted.

EXAMPLE 1

An aluminium phosphide composition 14 containing 6,0 g aluminium phosphide, calculated as pure AlP is introduced into the reaction vessel and the apparatus is put into operation. The composition comprises technical aluminium phosphide having a an AlP content of 85%, ground to a particle size such that all of it passes a 2 mm screen. A typical particle size distribution is such that 85 to 95%, e.g. 92% passes 1 ram; between 8 and 20, e.g. 12% is from 0,5 to 1,0 mm; between 20 and 35%, e.g. 27% is from 0,25 to 0,5 mm; between 25 and 40%, e.g. 33% is from 0,1 to 0,25 mm and the balance is finer.

Optionally the powder may be mixed with the usual additives employed in the art in which case the AlP content is for example 57%, the balance being conventional inert substances.

The throttle valve 20 is set to a flow rate of 1,86 l/min as indicated by the flow meter 21. The air entering at 2 is shown by sensor 3 to have a relative humidity of 40%, the temperature being 25°, this corresponds to an absolute moisture content of 8 grams/m$^3$. After 5 minutes the phosphine concentration leaving the generator vessel 13 at 18 is 5 500 ppm v/v. That concentration remains constant for 4¼ hours and then drops rapidly.

EXAMPLE 2

Figure 2A:
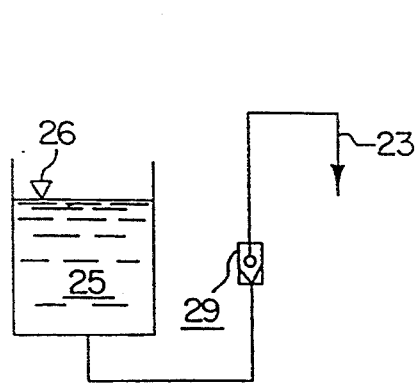
Figure 2B:
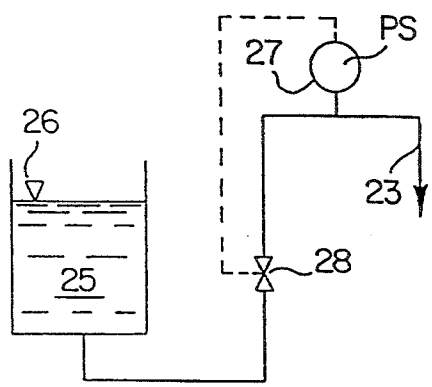

The test according to FIG. 2, example 1, is repeated, this time with 15,7 g AlP. The air flow rate is adjusted to 0,33 l/min. The temperature and the relative humidity of the air introduced at 2, fluctuate between 15° C. and 28° C., respectively between 40% and 85%, corresponding to an absolute humidity which remains approximately constant at 9 g/m$^3$.

The phosphine content of the gas mixture at 18 after 5 minutes had attained a concentration of 6000 ppm v/v. This concentration remained constant for 60 hours and then dropped rapidly.

In example 1 magnesium phosphide can be used instead of aluminium phosphide but is less preferred. The particles are then generally coarser, say on average by a factor of 2 to 4 times.

Under "one shot" conditions the phosphine laden air is introduced, e.g. to the bottom of a space (e.g. silo), displacing air, e.g. through the top. In "flow through" conditions the gas displaced from the space is returned to the inlet side of the pump 1 and is circulated in a closed loop.

The claims which follow are to be considered an integral part of the present disclosure. Reference numbers (directed to the drawings) shown in the claims serve to facilitate the correlation of integers of the claims with illustrated features of the preferred embodiment(s), but are not intended to restrict in any way the language of the claims to what is shown in the drawings, unless the contrary is clearly apparent from the context.

What is claimed is:

1. A fumigation process, which comprises the steps of
   (a) providing an enclosed generating space supplied with a hydrolysable metal phosphide and an enclosed fumigating space which is separate and distinct from the generating space,
   (b) generating a mixture of phosphine gas and air having a phosphine gas concentration below the level at which an explosion can occur by bringing into contact in the generating space so as to react with one another the hydrolysable metal phosphide and water, causing phosphine to be released into air to form said mixture;
   (c) withdrawing from the generating space the phosphine gas so generated and propelling it so as to feed it as said mixture of air and phosphine gas in an air flow into the fumigating space; and
   (d) preventing the build-up of autoignitable concentrations of air and phosphine gas in the generating space and in said mixture of air and phosphine gas by regulating and controlling the combination of steps (b) and (c) .

2. A fumigation process as claimed in claim 1, wherein step (d) includes the step of regulating the rate of formation of phosphine gas in relation to the rate of withdrawal thereof from the generating space.

3. A fumigation process as claimed in claim 1, wherein step (d) includes regulating the rate of admission of water to the generating space.

4. A fumigation process as claimed in claim 1, wherein step (d) includes introducing into the generating space a flushing medium.

5. A fumigation process as claimed in claim 4, wherein the flushing medium is a gas inert to the metal phosphide.

6. A fumigation process as claimed in claim 4, wherein the flushing medium is a liquid inert to the metal phosphide.

7. A fumigating process as claimed in claim 1, wherein step (d) includes the step of feeding air into the generating space through a drying medium.

8. A fumigation process, which comprises the steps of
   (a) providing an enclosed generating space supplied with a hydrolysable metal phosphide and an enclosed fumigating space which is separate and distinct from the generating space,
   (b) generating a mixture of phosphine gas and air having a phosphine gas concentration below the level at which an explosion can occur by bringing into contact in the generating space so as to react with one another the hydrolysable metal phosphide and water, causing phosphine to be released into air to form said mixture;

(c) withdrawing from the generating space the phosphine gas so generated and propelling it so as to feed it as said mixture of air and phosphine gas in an air flow into the fumigating space; and (d) monitoring the performance of steps (b) and (c) in relation to phosphine concentration build-up or conditions leading to such build-up, and (e) in response to said monitoring the performance indicating a malfunction, reducing or stopping the generation of phosphine or lower the concentration of phosphine in the generating space and in said mixture of air and phosphine gas by introducing a fluid medium inert to the metal phosphide into the generating space.

9. A fumigating process as claimed in claim 8, wherein the water in step (b) is present in the form of moist air and the fluid medium inert to the metal phosphine displaces the moist air from contact with the metal phosphide.

10. A fumigating process as claimed in claim 8, wherein step (d) includes monitoring the phosphine concentration in the generating space by a phosphine sensing device.

11. A fumigating process as claimed in claim 8, wherein step (d) includes monitoring the pressure in the generating space.

12. A fumigating process as claimed in claim 8, wherein the fluid medium inert to the metal phosphide introduced into the generating space in step (e) is a gas.

13. A fumigating process as claimed in claim 12, wherein air is passed into the generating space through a drying medium to render the air inert or more inert to the metal phosphide.

14. A fumigation process, which comprises the steps of (a) providing an enclosed generating space supplied with a hydrolysable metal phosphide and an enclosed fumigating space which is separate and distinct from the generating space and (b) generating a mixture of phosphine gas and air having a phosphine gas concentration below the level at which an explosion can occur by bringing into contact in the generating space so as to react with one another the hydrolysable metal phosphide and water, causing phosphine to be released into air to form said mixture;

(c) withdrawing from the generating space the phosphine gas so generated and propelling it so as to feed it as said mixture of air and phosphine gas in an air flow into the fumigating space; and (d) monitoring the process for a malfunction in relation to power failures, a disruption of air flow or a rise of phosphine generation in said mixture or a change in pressure in the generating space occurring above a predetermined level, and (e) in response to the monitoring indicating such malfunction reducing or stopping the generation of phosphine or lower the concentration of phosphine in the generating space and in said mixture of air and phosphine gas by introducing a fluid medium inert to the metal phosphide into the generating space.

15. A fumigating process as claimed in claim 14, herein the fluid medium inert to the metal phosphide introduced into the generating space in step (e) is a gas.

16. A fumigation process which comprises the steps of:

(a) providing an enclosed generating space supplied with a hydrolysable metal phosphide and contacting the hydrolysable metal phosphide with water in the generating vessel causing a hydrolysis reaction between the hydrolysable metal phosphide and the water, whereby a fumigating gas including a mixture of air and phosphine containing a poisonous concentration of phosphine gas having a phosphine gas concentration below the level at which an explosion can occur is formed;

(b) connection the generating vessel by duct means to a fumigating space where fumigation takes place separate and distinct from the generating space.

(c) withdrawing from the generating space the fumigating gas and propelling it through the duct means into the fumigating space;

(d) monitoring by monitoring means the performance of one or more of steps (a), (b) and (c);

(e) connecting to the generator vessel a source of a fluid flushing medium inert to the metal phosphide and controlling the admission or non-admission of said flushing medium into the generator vessel, such as to cause the admission in response to an abnormality in predetermined performance being detected by step (d).

17. A fumigating process as claimed in claim 6, wherein in step (c) the fumigating gas is introduced into an air flow and is fed in the air flow into the fumigating space.

18. A fumigating apparatus comprising (a) generator vessel supplied with a hydrolysable metal phosphide and wherein the hydrolysable metal phosphide is contacted with water, causing a hydrolysis reaction to take place whereby a fumigating gas including a mixture of air and phosphine gas containing a poisonous concentration of phosphine gas having a phosphine gas concentration below the level at which an explosion can occur is formed.

(b) in a fumigating space where fumigation takes place, separate and distinct from the generator vessel and a gas duct connecting the generator vessel to the fumigating space, (c) propulsion means for propelling the fumigating gas, after having been withdrawn from the generator vessel, through the gas duct into the fumigating space, (d) means for monitoring the performance of one or more of the generator vessel, the gas duct and the propulsion means, (e) a source of a fluid flushing medium, connected by duct means to the generator vessel and means for controlling the admission or non-admission of said flushing medium into the generator vessel and set to cause said admission in response to an abnormality in predetermined performance being detected by the means for monitoring the performance.

19. A fumigating apparatus as claimed in claim 18, wherein the means for monitoring include at least one of:

(a) pressure monitoring means,
(b) phosphine concentration monitoring means
(c) monitoring means for detecting a power failure.

20. A fumigating apparatus as claimed in claim 19, including each of the said monitoring means.

21. A fumigating apparatus as claimed in claim 18, wherein the source (e) is a reservoir containing the fluid flushing medium.

22. A fumigating apparatus as claimed in claim 21, wherein the reservoir contains a gaseous flushing medium under pressure.

23. A fumigating apparatus as claimed in claim 22, wherein the reservoir is a gas bottle filled with gas inert to the metal phosphide.

24. A fumigating apparatus as claimed in claim 23, wherein the gas inert to the metal phosphide is $CO_2$.

25. A fumigating apparatus as claimed in claim 18, including means for feeding air through a drying medium and means for feeding the air so dried into the generating space.

* * * * *